United States Patent [19]  
Kawaguchi et al.

[11] 4,063,483  
[45] Dec. 20, 1977

[54] APPARATUS FOR SEVERING BILLETS

[75] Inventors: Toshiro Kawaguchi, Yamaguchi; Setuo Fujii; Katsuhiko Matsui, Ube, both of Japan

[73] Assignee: Ube Industries, Ltd., Ube, Japan

[21] Appl. No.: 772,262

[22] Filed: Jan. 25, 1977

[30] Foreign Application Priority Data

Feb. 27, 1976  Japan .................. 51-20115

[51] Int. Cl.² .............................. B26D 1/04
[52] U.S. Cl. ........................ 83/382; 83/198; 83/199; 83/580; 83/639
[58] Field of Search ............. 83/123, 196, 198, 199, 83/382, 562, 563, 580, 639

[56] References Cited

U.S. PATENT DOCUMENTS 3,204,504  9/1965  Bradlee ....................... 83/198
3,972,257  8/1976  Lazar, Jr. ..................... 83/198

Primary Examiner—Willie G. Abercrombie  
Attorney, Agent, or Firm—Charles E. Pfund

[57] ABSTRACT

The severing apparatus comprises a horizontal frame, a first pair of a lower stationary die and an upper swinging die, and a second pair of a lower movable die and an upper movable and swinging die. Each die is formed with a semicircular recess for receiving a billet. The first and second pairs are juxtaposed on the horizontal frame in the axial direction of the recesses. The second pair is slidable with respect to the first pair in the horizontal direction perpendicular to the axial direction of the recesses for severing the billet. The upper swinging die of the first pair and the upper movable and swinging die of the second pair are swung with respect to the lower stationary die and the lower movable die for receiving the billet.

7 Claims, 4 Drawing Figures

APPARATUS FOR SEVERING BILLETS

BACKGROUND OF THE INVENTION

This invention relates to apparatus for severing billets for use in an extrusion press.

An aluminum billet, for example, conventionally used in an extrusion press is cut to have a predetermined length and heated to a suitable temperature. However, since this method tends to waste the billet and is uneconomical, it is the present day practice to preheat a long billet in a furnace and then sever the billet to desired cut length on the outside of the furnace. In a prior art severing device utilized to sever a long preheated billet into desired lengths, for example in the apparatus disclosed in U.S. Pat. No. 3,348,441, adjacent cylindrical stationary die and cylindrical movable die slidable in the vertical direction in contact with the stationary die are disposed on the same horizontal axis, the billet is inserted into the openings of these cylindrical dies and the movable die is slid in the vertical direction to sever the billet. Accordingly, it has been difficult to design the stationary die and the movable die to have cylindrical openings of the same size and shape as the cross-section of billets to be severed so that it has been inevitable to form a small gap between the inner surface of the movable and stationary dies and the outer surface of billet. This is caused by the fact that it is necessary to make the inner diameters of the dies to be larger than the outer diameter of the billet for the purpose of readily inserting the billet into the openings. Where there is a gap between the inner surfaces of the stationary and movable dies and the billet, as the billet is severed by sliding the movable die, the cross-sectional configuration of the severed billet becomes eliptical to an extent corresponding to the gap between the inner surfaces of the dies and outer surface of the billet and the severed end is rounded. Due to the fact that a continuously cast aluminum billet is usually used for an extrusion press, the outer diameter of the billet is not so accurately finished as by machining, it is impossible to avoid the formation of the gap between the inner surfaces of the dies and the billet. For this reason, it has been necessary to increase the thickness of the dies so as to increase the clamping width for the billet thus preventing decrease in the severing capability.

When the sectional configuration of the severed billet becomes eliptical or the severed end surface is not perpendicular to the axis of the billet or rounded, an eccentric load will be applied to an extension stem utilized to extrude the billet thus breaking the stem. When the severed surface is irregular, air will be entrapped during the extrusion step thereby degrading the quality of the extruded products.

When severed by a shear action, the severed surface tends to contract in the severing direction but to expand in a direction perpendicular to the direction of severing with the result that an eliptical shape is formed. To minimize such deformation, it is advantageous to use dies that clamp the billet without gap at the time of severing. On the other hand, when inserting or withdrawing the billet from the dies, the billet should not be clamped by the dies and a gap should be formed between the billet and the dies.

In order to satisfy these contradictory conditions, as has been disclosed in Japanese utility model publication No. 13024/1972, it has been proposed to divide a cylindrical stationary die into a semicircular stationary die having an inner surface with the same radius of curvature as the outer diameter of the billet and a semicircular first movable die and further to divide a cylindrical movable die into second and third semicircular movable dies each having an inner surface of the same radius of curvature as the outer diameter of the billet. During severing, the dividing surfaces of the dies are closely fitted together and closely fitted to the billet and the dies are separated from the billet before and after the severing step. According to this proposal, the direction of clamping of the dies of the billet and the direction of severing are in the same direction, that is in the vertical direction. Accordingly, at the time of severing, the severing plane tends to expand in a direction perpendicular to the direction of severing so that when the billet remaining in the stationary dies is withdrawn therefrom after severing and when the billet is reinserted into the stationary dies after being reheated in the furnace, the flared portion of the billet will prevent smooth insertion of the billet into the ends of the stationary dies, thereby making it difficult to smoothly and correctly insert and clamp the billet.

To solve this problem, the same applicant as the present application has proposed an improved billet severing apparatus in which each of the stationary and movable dies is divided into two parts and the direction of clamping of the divided dies is made to be perpendicular to the direction of severing (laid open specification of Japanese utility model application No. 87935/1973). In this apparatus, since both of the stationary and movable dies are divided into two semicircular dies separable in the horizontal direction for clamping the billet frpm both sides and the movable die is slid in the vertical direction for severing the billet it is possible to obviate above described difficulty in which the severed plane spreads in a direction perpendicular to the direction of severing and to readily insert the remaining billet into the dies. With this apparatus, however, since the clamping of the separable semicircular dies of stationary and movable die assemblies is effected by a large vertical clamping cylinder mounted on the top of the apparatus for the purpose of decreasing the number of the clamping cylinders, the height of the apparatus is unduly increased. Moreover, as the billet is clamped by the vertical stroke clamping cylinder through a wedge mechanism, the construction of the clamping mechanism for the semicircular separable dies is complicated. The conventional billet severing apparatus is generally of the vertical type so that it is necessary to use an elaborate equipment for installing the apparatus. As above described, the height of the apparatus is increased because the vertical clamping cylinder is mounted on the top of the apparatus. Moreover, as it is necessary to provide a vertical shear cylinder beneath the apparatus for vertically moving the movable die. For this reason, it is necessary to form a vertical hole through the floor bed for accommodating the vertical shear cylinder, thus complicating the installation operation and increasing the cost of installation.

SUMMARY OF THE INVENTION

Accordingly, it is an object of this invention to provide an improved billet severing apparatus having simple and compact construction and capable of eliminating various disadvantages described above.

Another object of this invention is to provide improved billet severing apparatus capable of readily inserting and removing the billet into and from shearing dies even when the severed end of the billet is deformed as a result of severing.

According to this invention these and further objects can be accomplished by providing billet severing apparatus comprising a horizontal frame, a first pair of a lower stationary die and a upper swinging die, each being provided with a semicircular recess for receiving a billet, a second pair of a lower movable die and an uper movable and swinging die, each being provided with a semicircular recess for receiving the billet, the first and second pairs being juxtaposed in the axial direction of the recesses, the second pair being slidable with respect to the first pair in the horizontal direction perpendicular to the axial direction of the recesses, the upper swinging die of the first pair and the upper movable and swinging die of the second pair being swingable in the vertical direction with respect to the lower stationary die and the lower movable die, means secured to the horizontal frame for sliding the lower movable die and the upper movable and swinging die of the second pair, and means for swinging the upper swinging die of the first pair and the upper movable and swinging die of the second pair.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
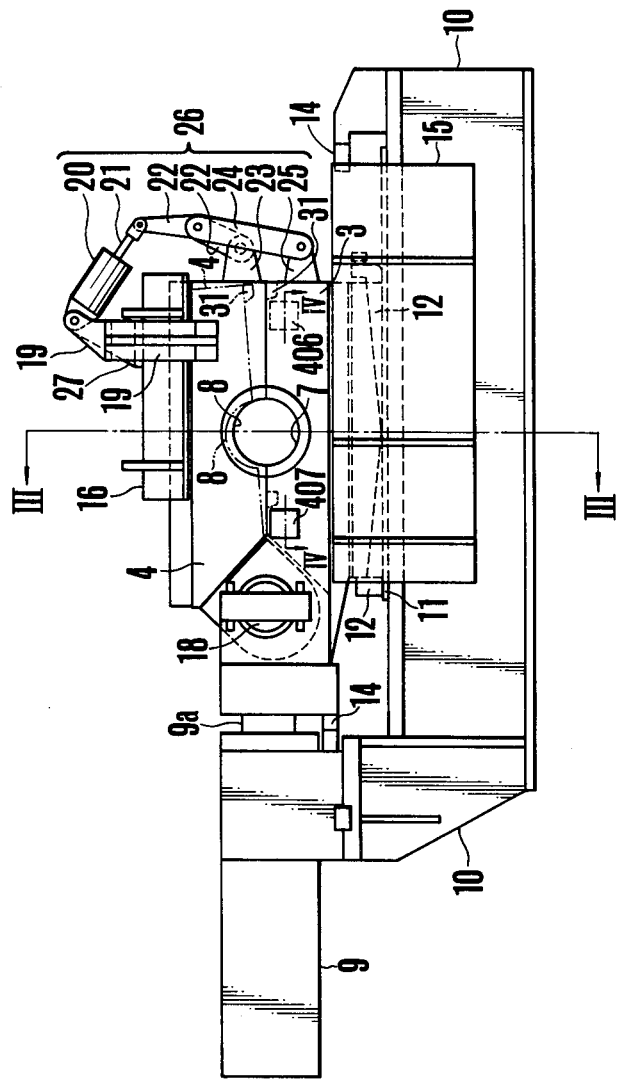
FIG. 1 is a front view showing the billet severing apparatus embodying the invention.
Figure 2:
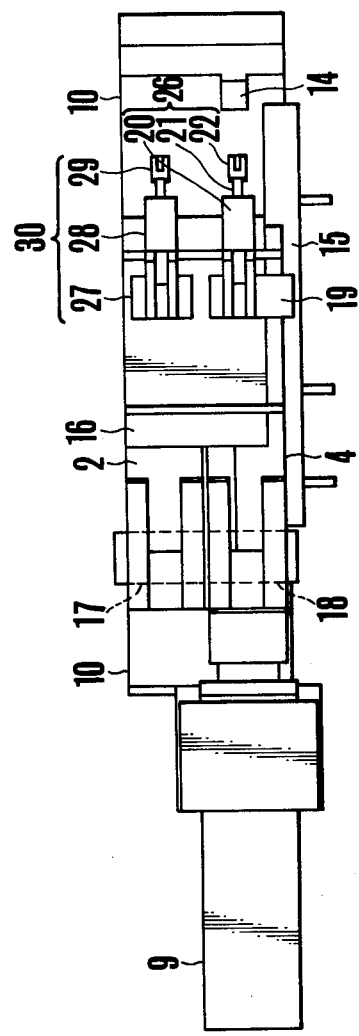
FIG. 2 is a plan view of the severing apparatus shown in FIG. 1.
Figure 3:
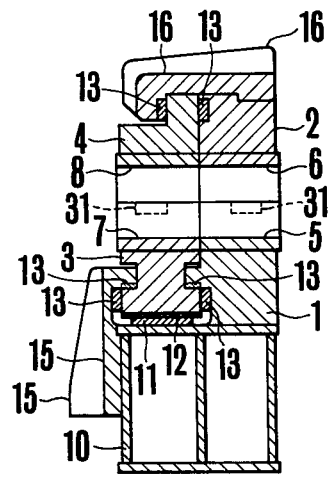
FIG. 3 is a cross-sectional view of the apparatus shown in FIG. 1 taken along a line III-III.

A preferred embodiment of this invention shown in the accompanying drawings comprises a lower stationary die 1, an upper swinging die 2, a lwer movable die 3, and an upper movable and swinging die 4, respectively provided with semicircular recesses 5, 6, 7 and 8 for receiving a billet. The lower stationary die 1 and the upper swinging die 2 are disposed with their recesses 5 and 6 faced with other. Similarly, the lower movable die 3 and the upper movable and swinging die 4 are disposed with their recesses 7 and 8 faced with each other. One pair including the lower stationary die 1 and the upper swinging die 2 and the other pair including the lower swinging die 3 and the upper movable and swinging die 4 are closely mounted on a horizontal frame 10 in the axial direction of the recesses 5, 6, 7 and 8. The assembly of the lower movable die 3 and the upper movable and swinging die 4 is moved in the horizontal direction perpendicular to the axial direction of the recesses 7 and 8 by a piston-cylinder assembly 9 with respect to the other pair comprising the lower stationary die 1 and the upper swinging die 2. The piston-cylinder assembly 9 of the oil pressure type, for example, is secured to the horizontal frame 10. The piston rod 9a of the assembly 9 is connected in common to one end of the respective lower movable die 3 and the upper movable and swinging die 4.

A guide plate 11 is mounted on the horizontal frame 10 and a guide shoe 12 is secured to the lower surface of the lower movable die. Guide plates 13 are interposed between the lower stationary die 1 and the lower movable die 3 as well as between the upper swinging die 2 and the upper movable and swinging die 4. Furthermore, there are provided stopping members 14, a guide block 15 secured to the horizontal frame 10, and a guide block 16 secured to the upper swinging die 2. The lower movable die 3 and the upper movable and swinging die 4 are caused to slide along guide blocks 15 and 16, respectively. Of course, guide plates 13 are interposed between the sliding surfaces of the upper movable and swinging die 4 and the guide block 16 as well as between the sliding surfaces of the lower movable die 3 and the guide block 15.

The upper movable and swinging die 4 is swingable, about a shaft 18 provided at the portion of aforementioned one end and extending in the axial direction of the recess 8, in the vertical direction with respect to the lower movable die 3. The upper swinging die 2 is provided with a shaft 17 at one end adjacent said one end in line with the shaft 18. Consequently, the upper swinging die 2 can swing about shaft 17 in the vertical direction with respect to the lower stationary die.

A bracket 19 is mounted above the guide block 16 secured to the upper surface of the upper swinging die 2. The lower end of the bracket 19 is secured to the upper movable and swinging die 4 while the upper end is spaced a little from the guide block 16. A clevis type piston-cylinder assembly 20 is mounted on the bracket 19, and one end of a first link 22 is pivotally connected to the free end of a piston rod 21 of the piston rod 21 of the piston-cylinder assembly 20. The other end of the first link 22 is pivotally connected to a bracket 23 secured to the upper movable and swinging die 4. A second link 24 is pivotally connected to an intermediate point of the first link 22 and the other end of the link 24 is pivotally mounted on a bracket 25 secured to the lower movable die 3. The piston-cylinder assembly 20, links 22 and 24 which are provided between bracket 19, lower movable die 3 and upper movable and swinging die 4 constitute a die opening and closing device 26 so that when the piston-cylinder assembly 20 is operated, the upper movable and swinging die 4 is swung about shaft 18 in the vertical direction thereby the dies are opened. Similar die opening and closing device 30 comprising bracket 27, piston-cylinder assembly 28 and piston rod 29 is provided between guide block 16, lower stationary die 1 and upper swinging die 2. Accordingly, the upper swinging die 2 and the upper movable and swinging die 4 can be opened or closed simultaneously by the simultaneous operation of both piston-cylinder assemblies 20 and 28. The extent of opening of the dies is about 10 mm, for example.

A doweled joint 31, consisting of a recess and a projection provided for the upper surface of the lower stationary die 1, the lower surface of the upper swinging die 2, the upper surface of the lower movable die 3 and the lower surface of the upper movable and swinging die 4, is provided for aligning the axes of respective recesses 5 through 8.

Figure 4:
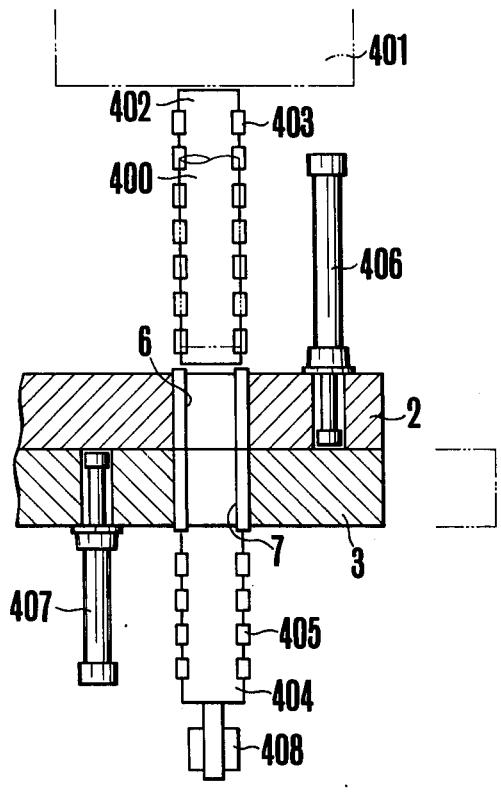
FIG. 4 is a sectional view of the apparatus shown in FIG. 1 taken along a line IV-IV.

The billet severing apparatus of this invention operates as follows: As best shown in FIG. 4, an elongated billet 400 heated by a furnace 401 is conveyed to the die assembly by a carriage 402 provided with rollers 403.

To sever the billet the upper swinging die 2 and the upper movable and swinging die 4 are first opened as shown in FIG. 1 at phantom lines by operating the die opening and closing devices 26 and 30. Then, the billet is inserted into the recesses 5 through 8 by the carriage 402. The front end of the billet 400 is stopped by adjustable stopping member 408 for determining the cut length of the billet. In this example, it is assumed that the billet has a contour conforming to the curved surfaces of the recesses 5 through 8. Then the upper swinging die 2 and the upper movable and swinging die 4 are closed by the die opening and closing devices 26 and 30, thus clamping the billet.

Then, the piston-cylinder assembly 9 is operated to slide the assembly of lower movable die 3 and upper movable and swinging die 4 in the horizontal direction, that is in a direction perpendicular to the axes of the recesses 5 through 8, thereby severing or shearing the billet. At this time, the pair comprising the lower movable die 3 and the upper movable and swinging die 4 is moved to a position shown at phantom lines in FIG. 4 at which the pair comes to engage the stopping member 14 so that recesses 7 and 8 come to oppose the pusher cylinder 406 secured to the lower stationary die 1. On the other hand, the recesses 5 and 6 of the lower stationary die 1 and the upper swinging die 2 come to oppose the returning cylinder 407 secured to the lower movable die 3. Consequently, as the upper swinging die 2 and the upper movable and swinging die 4 are opened by the die opening and closing devices 26 and 30, the severed billet in the recesses 7 and 8, is pushed by the cylinder 406 onto rollers 405 on a roller table 404 secured to the lower movable die 3. The remaining billet, a portion thereof being maintained in the recesses 5 and 6 is pushed back onto the rollers of the carriage 402 by the returning cylinder 407 and returned to the furnace thus completing one cycle of the severing operation.

The timing of the operations of the die opening and closing devices 26 and 30, piston-cylinder assembly 9, pusher cylinder 406 and returning cylinder 407 may be made manually or automatically. Of course, where billets having different diameters are to be severed, dies having corresponding recesses are substituted for.

The remaining billet is returned to the furnace for reheating and then severed by the severing apparatus. Since the billet is severed by a force acting in the horizontal direction, the cut surface of the billet may become eliptical having major axis in the vertical direction. However as the billet is inserted or removed from the apparatus with semicircular recesses 5 through 8 which are opened in the vertical direction, it is possible to smoothly insert and remove the billet with a relatively small force.

As above described, the invention provides improved billet severing apparatus having simple and compact construction which can readily and smoothly insert and remove a billet and can be installed on a narrow and plain floor. Moreover, it is easy to repair and exchange the component elements of the apparatus.

While the invention has been shown and described in terms of a preferred embodiment, it will be clear that many changes and modifications will be obvious to one skilled in the art.

What is claimed is:

1. Billet severing apparatus comprising a horizontal frame; a first pair of a lower stationary die and an upper swinging die, each being provided with a semicircular recess for receiving a billet; a second pair of a lower movable die and an upper movable and swinging die, each being provided with a semicircular recess for receiving the billet; said first and second pairs being juxtaposed in the axial direction of said recesses; said second pair being slidable with respect to said first pair in the horizontal direction perpendicular to the axial direction of said recesses; said upper swinging die of the first pair and said upper movable and swinging die of the second pair being swingable in the vertical direction with respect to said lower stationary die and said lower movable die; means secured to said horizontal frame for sliding the lower movable die and the upper movable and swinging die of said second pair; and means for swinging said upper swinging die of the first pair and said upper movable and swinging die of the second pair.

2. The billet severing apparatus according to claim 1 wherein said swinging means comprises a piston-cylinder assembly including a piston rod connected in common to one end of the lower movable die and the upper movable and swinging die of the second pair.

3. The billet severing apparatus according to claim 1 wherein said upper movable and swinging die of the second pair is pivotally mounted on a first shaft extending in parallel with the axes of said recesses, and said upper swinging die of said first pair is pivotally mounted on a second shaft extending in line with said first shaft.

4. The billet severing apparatus according to claim 3 wherein said swinging means comprises a first clevis type piston-cylinder assembly mounted on the upper swinging die of the first pair, a first linkage interconnecting the piston rod of said first clevis type piston-cylinder assembly with the lower stationary die, a second clevis type piston-cylinder assembly mounted on the upper movable and swinging die, and a second linkage interconnecting the piston rod of said second clevis type piston-cylinder assembly with the lower movable die.

5. The billet severing apparatus according to claim 1 which further comprises a first guide member secured to said upper swinging die of the first pair and a second guide member secured to said horizontal frame, said first and second guide members guiding the sliding movement of said second pair of dies.

6. The billet severing apparatus according to claim 5 wherein said swinging means is provided above said first guide member so that said upper swinging die of the first pair and said upper movable and swinging die of the second pair are swung simultaneously 7. The billet severing apparatus according to claim 1 wherein each recess has a curved surface conforming the contour of the billet.

* * * * *